Oct. 6, 1964

S. C. MUT 3,152,314

METHOD FOR OBTAINING SEISMIC VELOCITY DATA USING
WELL LOGS AND SEISMOGRAMS

Filed Sept. 4, 1959

INVENTOR.
STUART C. MUT

ATTEST

BY
ATTORNEY

United States Patent Office 3,152,314
Patented Oct. 6, 1964

3,152,314
METHOD FOR OBTAINING SEISMIC VELOCITY DATA USING WELL LOGS AND SEISMOGRAMS
Stuart C. Mut, Dallas, Tex., assignor to The Atlantic Refining Company, Philadelphia, Pa., a corporation of Pennsylvania
Filed Sept. 4, 1959, Ser. No. 838,236
5 Claims. (Cl. 340—15.5)

The present invention relates to a method for obtaining velocity data using well logs and seismograms. More specifically, the present invention relates to the method of constructing a synthetic seismogram produced from a continuous velocity log or from other type well logs and the use of the synthetic seismogram produced therefrom to obtain average velocity data. The method is most useful as a means for improving available velocity data in areas where additional well velocity surveys are not available. Even in areas where some type of acoustic log was run in the wells, the present invention is valuable if check shots were not made during the acoustic logging. Acoustic data without check shots is not good enough to give reliable velocity data in many cases and the present method can be used in lieu of the check shots to eliminate systematic errors in the logging data.

In certain areas today, such as parts of west Texas, New Mexico, and other areas where little exploratory work has been done, seismic velocity control is poor. The wells in these areas are sparse, spaced over considerable distance, and many of them are shut in or plugged. In many cases, no type of velocity information was obtained when the wells were drilled. It is usually prohibitive costwise to run a continuous velocity log or a well velocity survey in these wells to obtain velocity data since it necessitates removing tubing and/or casing and, in some cases practically redrilling the well. To date, the only other alternatives in obtaining adequate velocity control in such areas are by using refractions or by detailed analysis of stepout relations in good reflection work, for example, the so-called $X^2 - T^2$ method. However, these alternatives are not entirely satisfactory for several reasons.

First, they are objectionable since they require good refracting or reflecting horizons at a number of depths, uniform weathering conditions, and other geological conditions that may or may not be met. Second, the precision obtainable is usually low and the cost of shooting the required spreads is considerable.

It is therefore an object of this invention to provide a novel method of obtaining improved velocity control in areas as described above.

Another object of this invention is to provide a method of obtaining velocity control for seismic work in areas where there are few wells which have been surveyed for velocity.

An additional object of this invention is to provide a method of obtaining velocity control in old wells.

Another object of this invention is to provide a method for obtaining velocity control without requiring the use of a continuous velocity log or well velocity survey.

An additional object of this invention is to provide a method for obtaining better velocity control than can be obtained by extrapolating the available well velocity data over long distances.

Another object of this invention is to improve the accuracy of synthetic seismograms when made from logs other than continuous velocity logs.

Briefly, the over-all method provides a means for obtaining improved seismic velocity data by using available well logs and field records. The method comprises the broad steps of: (a) Constructing synthetic seismograms from available well logs, (b) Correlating the synthetic seismogram with a seismic field record, (c) Obtaining the travel time from an event on the field record and the depth associated with the corresponding synthetic record event from the well log, and (d) Using the two values to develop an average velocity.

Figure 1:
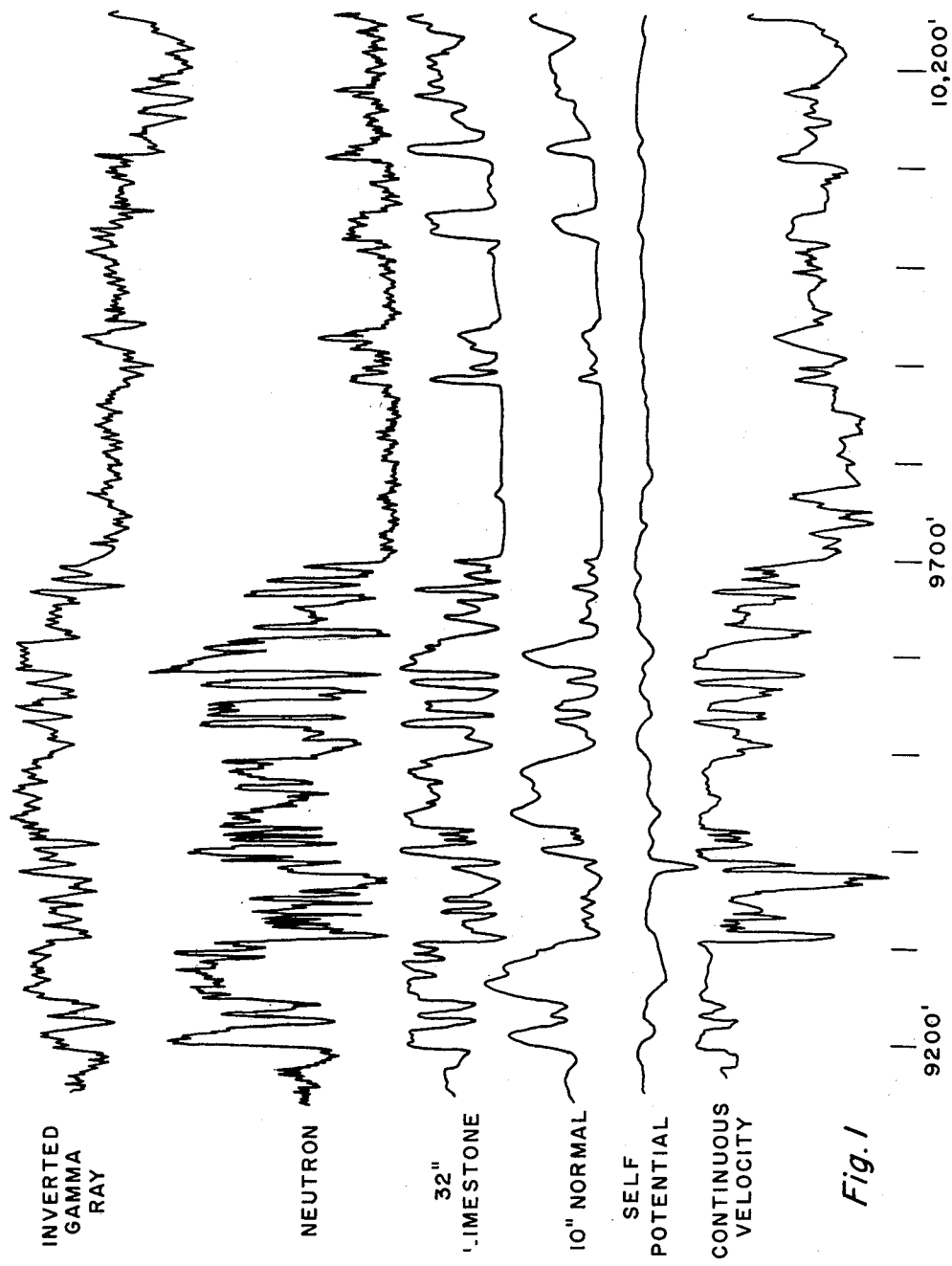
FIGURE 1 shows the similarity between various types of logs made in the same well.

Applicant's method, as outlined above, enables improved velocity data to be determined from old resistivity, neutron, etc., logs when well velocity surveys or continuous velocity logs are not available or it is impractical to obtain them. To be able to compute velocity data from old logs not only saves the expense of running a continuous velocity log or a well velocity survey, but it also saves the expense, which in many cases is prohibitive, of opening or reworking old wells so that the log or survey may be run. Applicant's method also offers substantial saving in money, manpower, time, and equipment over refraction or $X^2 - T^2$ methods of obtaining velocity data. Since most producers have some type of logging history on all their wells, applicant's method can be practiced without additional field trips (assuming reflection data of good quality near the well site is available).

The novel method was evaluated with excellent results both in New Mexico and west Texas fields. The following tables show test results listing average velocity determined by conventional means and average velocity determined by using applicant's method.

| | | Conventional Velocity Data | | | Velocity from Logs | | |
|---|---|---|---|---|---|---|---|
| Well Location | Formation | Depth [1] (ft.) | Avg. Velocity (ft./sec.) | Depth [1] (ft.) | Avg. Vel. Correlation Depths [2] (ft./sec.) | Avg. Vel. Extrapolated to Formation Depths (ft./sec.) |
| Well No. 1 | A | 3,875 | 10,844 | | | |
| | B | 7,515 | 13,172 | 7,428 | 13,240 | |
| | | | | 7,515 | | 13,250 |
| | | | | 7,978 | 13,260 | |
| | C | 8,795 | 13,512 | 8,795 | | 13,550 |
| | | | | 9,303 | 13,700 | |
| Well No. 2 | | 8,320 | 14,764 | 8,320 | 14,780 | |
| | C | 11,293 | 14,966 | 11,293 | | 14,820 |
| | | | | 13,309 | 14,870 | |
| | | | | 13,986 | 14,890 | |
| | | | | 14,478 | 14,850 | |
| | | 15,025 | 14,827 | 15,025 | 14,830 | |
| | D | 15,227 | 14,827 | 15,227 | | 14,820 |

See footnotes at end of table.

| | Conventional Velocity Data | | | Velocity from Logs | | |
|---|---|---|---|---|---|---|
| Well Location | Formation | Depth [1] (ft.) | Avg. Velocity (ft./sec.) | Depth [1] (ft.) | Avg. Vel. Correlation Depths [2] (ft./sec.) | Avg. Vel. Extrapolated to Formation Depths (ft./sec.) |
| Well No. 3 | A | 4,479 | 11,819 | | | |
| | | | | 6,062 | 12,800 | |
| | | | | 6,658 | 13,250 | |
| | | | | 7,273 | 13,720 | |
| | B | 8,007 | 14,528 | 8,007 | | 14,150 |
| | C | 9,564 | 15,115 | 9,564 | | 14,830 |
| | | | | | (a) 15,210 | |
| | | | | 10,182 | | |
| | | | | | (b) 14,900 | |
| Well No. 4 | | | | 3,905 | (a) 12,000 | |
| | | | | | (b) 11,660 | |
| | A | 4,222 | 12,140 | 4,222 | | 12,180 |
| | B | 7,725 | 14,793 | 7,725 | | 14,330 |
| | C | 9,315 | 15,272 | 9,315 | (a) 15,670 | 14,890 |
| | | | | 11,723 | (b) 15,310 | |
| | | | | | (a) 15,560 | |
| | | | | 12,656 | | |
| | | | | | (b) 15,310 | |
| | | | | 13,571 | 15,650 | |
| | D | 13,691 | 15,591 | 13,691 | | 15,600 |
| Well No. 5 | | 6,543 | 14,178 | | | |
| | | | | 6,614 | 14,530 | |
| | | 6,933 | 14,375 | 6,933 | | 14,650 |
| | E | 9,213 | 15,145 | 9,213 | | 15,290 |
| | | | | 9,316 | 15,300 | |
| | F | 9,535 | 15,121 | 9,535 | | 15,240 |
| | D | 10,278 | 14,844 | 10,278 | | 15,010 |
| | | | | 10,381 | 15,000 | |
| | | 10,733 | 14,990 | 10,733 | | 15,090 |
| | G | 12,341 | 15,243 | 12,341 | | 15,330 |
| | | | | 12,445 | 15,340 | |

[1] All depths and velocities measured from the seismic datum at each well.
[2] Velocity values labeled "a" and "b" correspond to correlations which could not be resolved between successive legs of a seismic event.

In the above set of tests, the velocity data was determined from neutron logs because they were available and appeared to correlate best in that particular area with a continuous velocity log.

Although the method of obtaining velocity data can be carried out on either a digital or an analog computer, the operations to be described hereinafter were carried out on a digital computer.

Heretofore, a synthetic seismogram has been computed directly from a well log (plotted to twice the vertical travel time). It was felt that the amplitude variations in the log used sufficiently approximated the variation in the acoustic impedance to produce a suitable synthetic seismogram. Of course, the approximation and the accuracy of the resulting synthetic record varies with the type of well log used to construct the record. FIGURE 1 shows the relationship between various types of logs made in the same well.

In applicant's method of operation, as will be described in detail hereinafter, if a resistivity, neutron, or a type other than a continuous velocity well log is used, it is usually first converted, by the use of an empirical velocity scale, into a synthetic continuous velocity log before the synthetic seismogram is computed. If a continuous velocity log is used, this step is, of course, not necessary. It should be noted, however, that the step of converting to a synthetic velocity log is not necessary in applicant's over-all method of obtaining continuous velocity data even if a continuous velocity log is not used. The construction of the synthetic continuous velocity log is a novel step which produces a refinement in the production of the synthetic seismogram. In other words, by converting the particular well log to a synthetic, continuous velocity log, the synthetic seismogram produced therefrom more closely resembles the synthetic seismogram that would have been computed from a log of the true acoustic impedance. This is true because there is not a linear relationship between the properties measured by the various logs and the acoustic impedance of the measured formations. Since the continuous velocity log most closely approaches acoustic impedance, as explained in Peterson's article, "Synthesis of Seismograms from Well Log Data," Geophysics, vol. 20, July 1955, pages 516–538, the production of a synthetic seismogram from continuous velocity or synthetic, continuous velocity logs is more accurate than the production of same from conventional resistivity and radiation well logs.

Reference is now made in more detail to the new method of developing average velocity data from well logs.

(I.) The first is to construct a synthetic seismogram from an available well log. The construction can be made as follows:

(A.) Converting the well log to an artificial, continuous velocity log. (If the continuous velocity log is used, this step is, of course, not necessary.)

While any available well log (neutron, gamma ray, resistivity, etc.) can be used, the best results are accomplished by using the available well log that best correlates with a continuous velocity log made somewhere in the general region of exploration. In the west Texas-New Mexico region, it was found that the neutron log produced synthetic seismograms which more readily correlated with the field records than those calculated from other type logs. However, in other areas, other type logs may be more satisfactory. It has been found that even a crude neutron reading to velocity conversion will often yield usable synthetic seismograms; but, of course, it is desirable to make as good a conversion as possible. From the teachings of Dewan, "Neutron Log Correction Charts for Borehole Conditions and Bed Thickness," Journal of Petroleum Technology, vol. 8, No. 2, pages 50–58, it is well known that the deflections on a neutron log may be thought of as a measure of the porosity of the formations. It is well known to those skilled in the logging art in the west Texas-New Mexico test area, it is usually the case that any substantial depth interval on the neutron log will contain beds of maximum or minimum porosities, say, 2 to 40 percent. Of course, other regions will vary in well known ways. In the test region, it can be considered that the maximum neutron log deflection is an interval which indicates 2 percent porosity and the minimum deflection indicates 40 percent porosity. A logarithmic scale adopted from the work of Dewan is used to interpolate porosities between these extremes on the log. Using Wyllie et al's data showing the relation between porosity and velocity in various kinds of rock, "Velocities in Heterogeneous and Porous Media," Geophysics, vol. 21, pages 41–70, a graph of velocity versus porosity is constructed to transform the porosity scale on the neutron log to a velocity scale. In other words, this empirical velocity scale is used to read velocities from a neutron log. It was found that the neutron-derived, synthetic, continuous velocity log correlated quite well with the major features of a continuous velocity log (made to test this conversion). It should be noted that where the neutron log is recorded with different sensitivities and/or different hole conditions, it is necessary to establish a different velocity scale for each of these parts of the log.

If the synthetic, continuous velocity log is developed from a resistivity log, say, a microlaterolog, the filtrate resistance is known and the porosity can be determined by Archie's equation. The 10 inch normal and 32 inch limestone logs also share this property of giving a resistivity indication that can be used in estimating porosity. Since it is well known that all types of well logs measure in varying degrees changes in lithology (see FIGURE 1), and since acoustic impedance is quite likely to change with lithology, other types of logs, such as the gamma log or self-potential log, can sometimes be used to construct a synthetic seismogram by employing an empirically determined, approximate conversion to acoustic impedance. This empirical conversion is carried out by comparing the log used with the nearest available velocity and/or density log.

(B) Converting the synthetic continuous velocity log which is plotted in terms of velocity versus depth to a velocity versus travel time log.

This is necessary since, in computing the synthetic seismogram, it is necessary to have the individual reflection impulses in approximately the proper time relation to each other. However, even if this travel time is only approximately correct, the final accuracy of the velocity determination is not affected. Its only use is to aid in locating on the neutron log (or other log used) the synthetic seismogram events correlated with the field record. This step may be accomplished in several ways. If a continuous velocity log is used, the integrated time scale is quite satisfactory. If a continuous velocity log is available within a reasonable distance, say 10 to 20 miles, depending on the area, and if the geological section has no gross changes between the two locations, the continuous velocity log's integrated time-depth scale may serve as an adequate first approximation. Usually, however, in areas such as these, a continuous velocity log is not available, while field office velocity maps usually are available and may be used to establish several depth intervals of approximately correct average interval velocity. In the particular area where the tests were run, the velocity maps covering the area of study were contoured on four formations. Thus, the time scale constructed for the neutron log in most cases was composed of four sections, each having a somewhat different depth-time conversion factor. As stated above, it should be remembered that this time-depth conversion scale is used only to establish an approximate time scale for the synthetic record, and these velocity assumptions do not figure in the final result, provided they are accurate enough to permit positive correlation of the synthetic and field seismic records.

(C) Computing a synthetic seismogram from the actual or synthetic, continuous velocity log.

This is conventional and can be computed on a digital or analog computer, as described in Peterson's article cited above. As pointed out supra, applicant's method can utilize a synthetic seismogram computed from the velocity log itself as taught by Peterson, or it can utilize the synthetic seismogram computed from a synthetic, continuous velocity log as described above.

(II) The second step is to correlate events on the synthetic seismogram with events on the field record.

This is a key step in the method and is perhaps the most difficult. As described above, the synthetic seismogram's time scale obtained from the available velocity data has some error since the map velocity contours are used as a basis on which to construct the approximate time scale of the synthetic record. It has been found in regions of sparse control and rapid lateral change in velocity, the approximate time scale could be off as much as ±7 percent; and in other areas, of course, the situation is likely to be much better. Therefore, the assumed average velocity is used with a ±7 percent uncertainty to establish a time bracket on the field record in which a given synthetic record event should be matched with its field record counterpart; i.e., if a reflection event occurs at 1.5 seconds on the synthetic record, a correlation should be accepted anywhere within the time interval of 1.4 to 1.6 seconds. The actual correlation is made on the basis of a character match between reflection events or complexes with considerable reliance being placed on the approximate matching of events other than the one of primary interest.

This step can be carried out electrically by the well known cross correlation method, as described in detail in copending application, Serial No. 781,154, now abandoned, owned by a common assignee; by an analog device such as disclosed in Raisbeck, U.S. Patent 2,854,197; or mechanically by the use of matching traces on overlay paper.

(III) The third step is to obtain the depth of the reflection events associated with the synthetic record from the log and the travel time to the corresponding events from the field record. This is done as follows:

(A) Determining the depth of the reflection events from the synthetic record and the log from which it was derived.

Since the synthetic seismogram is plotted in terms of approximate travel time (two-way), as described above, and since the neutron or other type log used to compute the synthetic seismogram is plotted in terms of true depth, the events on the synthetic seismogram which have been correlated with events on the field record must now be identified or correlated with events found on the log to determine their true depths. This is done by utilizing the approximate travel time scale set up on the synthetic seismogram and on the log. However, the well known waveform and filter delay corrections must be deducted from the synthetic record travel time before this time is used to locate the true depth of the event on the log.

Figure 2:
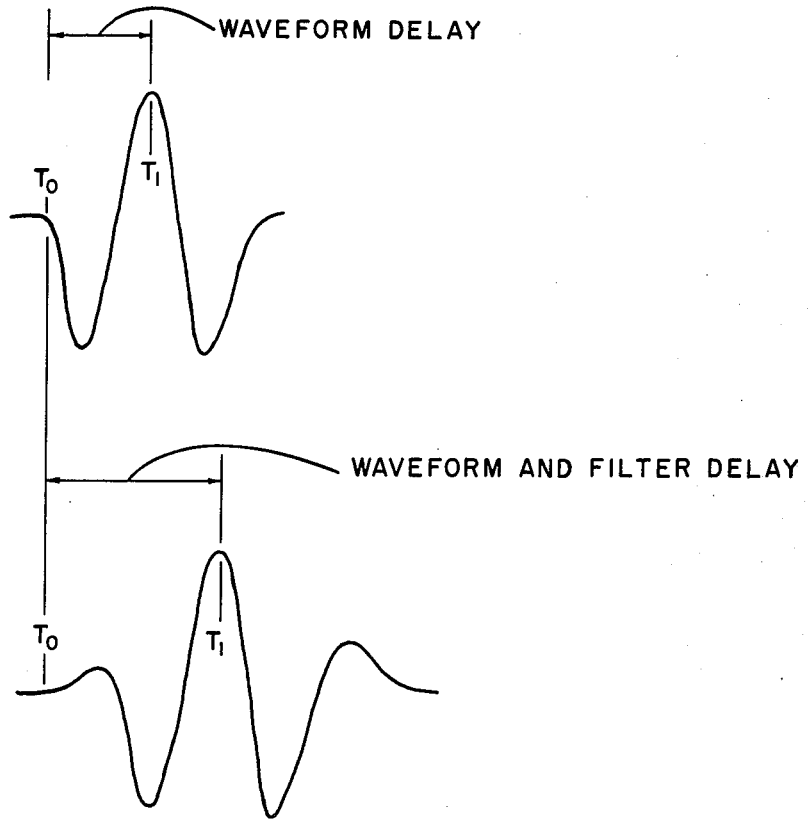
FIGURE 2 shows an example of a waveform and a filter delay.

To facilitate a better understanding of this correction, a brief review of the delay problem follows. The nature of the over all delay is illustrated in FIGURE 2. The time, $T_0$, is the "break-from-zero" time, and the time, $T_1$, is the time that would be picked for reflection on a field seismogram. The total time delay is due to:

(1) A "waveform delay," the time between the break-from-zero and the peak or trough usually picked to represent the time position of a reflection event. The pulse form, and hence the delay, is influenced in some degree by shooting techniques and the filter characteristics of the earth.

(2) A time delay in the seismic amplifiers, principally in the filters. In the test area of west Texas and New Mexico, this total delay was found to be approximately 50±5 milliseconds for records shot with 33–60 c.p.s. filter. This figure was determined conventionally from available field records and continuous velocity logs by determining break-from-zero times calculated from the velocity log with the field record times of the major peak or trough associated with a given event. This total delay time is usually constant throughout large areas (assuming a constant filter setting). However, if this method was used in Louisiana, for example, a new total delay time would then have to be determined. A similar type of delay also exists for synthetic seismograms. Here, of course, the total delay is precisely known and depends upon the reflection waveform assumed in the calculation.

To determine the adjusted travel time (approximate) of the events of interest on the synthetic record, the synthetic record's waveform and filter delay time is subtracted from the synthetic seismogram travel times. The results (corrected travel times) then represent the two-way break-from-zero times corresponding to the approximate time scale placed on the log. Thus, the true depth of the events can be read directly from the log by reading therefrom the depths corresponding to the corrected travel times.

If the reflection in question is an isolated one, the interface which caused the reflection event will be found on the log at this depth. In most cases, the prominent events or reflection complexes seen on records appear to be caused by sets of closely spaced interfaces. In these cases, the depth indicated by the procedure above, even though it corresponds to no single interface, is the correct depth for use in the computation.

(B) Determining the correct travel time of the correlated events on the field record.

The times of the correlated peaks or troughs are extracted from the field record and a correction to the desired datum plane is made. If offset shootings were employed or if the reflections display appreciable dip, corrections for these factors would also be applied. In addition, the 50±5 millisecond waveform and filter delay peculiar to the Texas-New Mexico area is subtracted, and the results are divided by two to give a one-way break-from-zero time of the correlated events. The filter and wave delay corrections discussed above as well as the other mathematical operations can be carried out by conventional electrical or mechanical means, if desired.

(IV) The fourth step is to develop the average velocity.

This step is accomplished by dividing the corrected (one-way) travel time into the depth (below datum) to obtain the average velocity of a particular event.

In the cases where it is impossible to choose between correlations due to adjacent peaks or troughs, it is probably desirable to select a point midway between two times in question. Later determinations in other nearby wells might permit the firm choice of one or the other of two possible values.

Again, as in the other steps, the mathematical operations can be carried out by conventional electrical or mechanical means.

It is clear from the description above, that applicant's novel method of obtaining velocity data from well logs and field records provides valuable information under various conditions that are common in the present exploration picture. As an example of such utility, the method can be used to improve velocity control data in areas where acoustic and velocity surveys are not available; and even if acoustic logs are available, the method is valuable in providing substitute data in case check shots were not made when the logs were run. Applicant's invention also provides a method of improving the quality of synthetic seismograms (when made from logs other than continuous velocity logs) by constructing synthetic continuous velocity logs from other type well logs.

It will be apparent to those skilled in the art that various modifications of the preferred mode of operation may be carried out without departing from the invention claimed herein. In addition, it is to be understood that the specific examples and suggested procedures set forth above are illustrative only and are not included by way of limitation except as set forth in the appended claims.

I claim:

1. A method of obtaining velocity data in areas where seismic velocity control is poor wherein velocity data to a particular subsurface event is determined from a preselected seismogram covering an area of interest containing said event and from a well log obtained in a well located adjacent a portion of said area of interest and containing said event comprising the steps of:
    (a) from the available logs made in the well and containing the event, indicating the log which best correlates with a continuous velocity log made somewhere in the general region of interest,
    (b) modifying the indicated well log to present an approximation of velocity versus two-way travel time,
    (c) constructing a synthetic seismogram from said modified log,
    (d) correlating the particular event on said synthetic seismogram with the corresponding event on the seismogram,
    (e) indicating travel time to said particular event and depth to said event by said correlation, and
    (f) determining the average velocity to said event.

2. In a method as set forth in claim 1 wherein the well log is modified to present approximate velocity versus two-way travel time by converting a resistivity scale on said log to a porosity scale and converting said porosity scale to a velocity scale.

3. In a method as set forth in claim 1 wherein the preselected well log is modified to present approximate velocity versus two-way travel time by converting a porosity scale on said log to a velocity scale by use of an empirical velocity scale.

4. In a method as set forth in claim 1 wherein the preselected well log is modified to present approximate velocity versus two-way travel time by converting a neutron scale on said log to a porosity scale and converting said porosity scale to said velocity scale.

5. In a method as set forth in claim 1 wherein the preselected log is modified to present approximate velocity versus two-way travel time by converting a gamma scale on said log to an acoustic impedance scale and converting said acoustic impedance scale to a velocity scale.

References Cited in the file of this patent

"The Synthesis of Seismograms From Well Log Data," by R. A. Peterson et al., Geophysics, vol. XX, No. 3, July 1955, pp. 515–538.